(12) United States Patent
Nakamura et al.

(10) Patent No.: US 6,596,789 B2
(45) Date of Patent: *Jul. 22, 2003

(54) NON-ASBESTOS FRICTION MATERIALS

(75) Inventors: Tomoki Nakamura, Tokyo (JP); Takeo Nagata, Tokyo (JP); Kazuhiro Takeuchi, Tokyo (JP); Mitsuru Kobayashi, Tokyo (JP)

(73) Assignee: Nisshinbo Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,235

(22) Filed: Aug. 26, 1999

(65) Prior Publication Data

US 2002/0006981 A1 Jan. 17, 2002

(30) Foreign Application Priority Data

Aug. 26, 1998 (JP) ............................................. 10-239692
Sep. 2, 1998 (JP) ............................................. 10-248660

(51) Int. Cl.$^7$ ................................................. C08J 5/14
(52) U.S. Cl. ........................ 523/155; 523/157; 523/158; 523/156
(58) Field of Search .............................. 523/155, 156, 523/205, 206, 208; 525/391, 500, 501, 502

(56) References Cited

U.S. PATENT DOCUMENTS

| | | | | |
|---|---|---|---|---|
| 4,320,823 A | * | 3/1982 | Covaleski | 192/107 |
| 4,722,950 A | * | 2/1988 | Miller | 523/156 |
| 5,502,109 A | * | 3/1996 | Wallenwein et al. | 525/141 |
| 5,576,358 A | * | 11/1996 | Lem et al. | 523/153 |
| 5,641,444 A | * | 6/1997 | Fujikawa et al. | 264/141 |
| 5,676,577 A | * | 10/1997 | Lam et al. | 442/60 |
| 5,817,411 A | | 10/1998 | Nakajima | |

FOREIGN PATENT DOCUMENTS

| | | | |
|---|---|---|---|
| DE | 1230205 | | 12/1966 |
| DE | 1905119 | | 9/1969 |
| DE | 4239441 | | 5/1994 |
| EP | 0695887 A | | 2/1996 |
| FR | 2746158 | | 9/1997 |
| GB | 1246699 | | 9/1971 |
| JP | 60184533 | | 9/1985 |
| JP | 60 51504 | | 11/1985 |
| JP | 05320372 A | * | 12/1993 |
| JP | 0881613 A | * | 3/1996 |
| JP | 9157632 | * | 9/1997 |
| JP | A-11-71497 | | 3/1999 |

* cited by examiner

Primary Examiner—Edward J. Cain
Assistant Examiner—Katasyna H. Lee
(74) Attorney, Agent, or Firm—Birch, Stewart, Kolasch & Birch, LLP

(57) ABSTRACT

A non-asbestos friction material made by molding and curing a composition comprised of a fibrous base, a binder, and a filler has a 100 Hz vibration damping factor (tan δ) at 300° C. minus tan δ at 50° C. value of at least −0.030. The binder may be a rubber-modified high-ortho phenolic resin, a resin mixture of a rubber-modified high-ortho phenolic resin and a rubber-modified phenolic resin, or a resin mixture of two or more rubber-modified phenolic resins. The friction material has an excellent and long-lasting noise performance, and good wear resistance, functional stability, and fade resistance. The rapid curability of the composition enables a short molding cycle.

28 Claims, 3 Drawing Sheets

NON-ASBESTOS FRICTION MATERIALS

BACKGROUND OF THE INVENTION

1. Field of the Invention

The present invention relates to non-asbestos friction materials highly suitable as disc pads, brake linings, clutch facings and the like in automobiles, heavy duty trucks, railroad cars, and various types of industrial equipment.

2. Prior Art

Friction materials used for braking in automobiles, heavy duty trucks, railroad cars, and various industrial equipment are desired to have a number of performance features. These features include excellent wear resistance, a friction coefficient that is both high and stable, outstanding resistance to brake fade, no generation of undesirable noises such as squeal during brake operation, resistance to wear debris formation, and short-time moldability.

For example, several attempts have been made to find a way to reduce brake squeal. These include the addition of rubber powder and the use as a binder of rubber-modified phenolic resins such as acrylic rubber-modified phenolic novolac resins, which have a low heat history-associated decline in damping properties, or nitrile rubber-modified phenolic novolac resins, which are endowed with excellent damping properties at ambient temperatures. The aim in this prior art has been to impart damping properties in order to increase vibration damping and reduce squeal (see, for example, JP-A 60-184533 and JP-B 60-51504).

However, nitrile rubber-modified novolac phenolic resins undergo a decline in vibration damping performance on account of heat history-associated changes over time, resulting in squeal. In addition, they have inadequate heat resistance. Adding this type of resin in an amount sufficient for noise suppression leads to a decline in braking performance. Acrylic rubber-modified novolac phenolic resins do have an excellent heat resistance, but have a poor moldability. Specifically, when these resins are molded under applied heat and pressure, blisters form and internal cracking tends to arise.

In order to enhance the manufacturability of friction materials, use has recently been made of high-ortho-novolac phenolic resins, which can be molded in a short period of time. Unfortunately, while the use of high ortho-novolac phenolic resins as the binder in friction materials does improve the rapid curability of the friction material composition, the molded article becomes harder and thus more likely to generate unwanted noise during brake operation.

All prior-art friction materials thus have various drawbacks which prevent them from fully satisfying the desire for better performance.

SUMMARY OF THE INVENTION

Therefore, one object of the present invention is to provide a non-asbestos friction material that has excellent rapid curability, enabling the molding cycle time to be shortened, and that essentially does not squeal during brake operation.

Another object of the invention is to provide a high-quality non-asbestos friction material endowed with robust vibration damping characteristics that are resistant to heat history-associated deterioration over time, minimal brake noise, and the ability to maintain these performance features over an extended period of time.

The inventor has learned that a noise suppressing effect is achieved when the value for the 100 Hz vibration damping factor (tan $\delta$) at 300° C. minus tan $\delta$ at 50° C. is at least −0.030. That is, because it is believed that a higher vibration damping factor is associated with less squeal and because ordinary friction materials show a marked decline in the vibration damping factor with rising temperature, the vibration damping factor at 50° C. has customarily been set at a relatively high value. Thus, a comparison of tan $\delta$ at 50° C. ($V_{50}$) with tan $\delta$ at 300° C. ($V_{300}$) in prior-art friction materials would show a large difference between $V_{50}$ and $V_{300}$. Specifically, $V_{300}$ is much smaller than $V_{50}$, with the difference $V_{300}$–$V_{50}$ often being more negative than −0.030. On account of this, the practice in the art has been to set $V_{50}$ at a high enough value to ensure that $V_{300}$ can still be maintained at or above a given level even if it decreases relative to $V_{50}$.

However, the inventor has found that when the difference $V_{300}$–$V_{50}$ is at least −0.030 (i.e., when the degree of decline of a vibration damping factor is so low that the difference of $V_{300}$ from $V_{50}$ is small or when $V_{300}$ is larger than $V_{50}$ (the difference $V_{300}$–$V_{50}$ is positive)), surprisingly, squeal is markedly suppressed even if $V_{50}$ is set at about the same value as the prior-art $V_{300}$ value rather than being set at a higher value according to the conventional practice.

Although it is not fully understood why there is such a noise suppressing effect when the decrease in the vibration damping factor is small or the damping factor becomes larger, the reasons generally appear to be as follows.

(a) During use, the temperature of the friction material itself varies due to friction. It is conceivable that when a material which does not squeal at a given temperature is selected, it will squeal at some other specific temperature. Given that squeal appears to be associated in some way with vibration damping, materials that undergo only small changes in the vibration damping factor relative to temperature changes are probably effective against squeal.

(b) Assuming squeal to be a form of resonance, a high vibration damping factor in combination with, as noted above, minimal change in the vibration damping factor due to changes in conditions should be effective for maintaining the initial performance, and ultimately for eliminating squeal.

The inventor has also found that non-asbestos friction materials made by molding and curing a composition comprised of a fibrous base, a binder and a filler, in which the binder is (1) a rubber-modified high-ortho phenolic resin, (2) a resin mixture of a rubber-modified high-ortho phenolic resin and a rubber-modified phenolic resin, or (3) a resin mixture of two or more rubber-modified phenolic resins, and especially (1) an acrylonitrile-butadiene rubber-modified high-ortho phenolic resin alone, (2) a resin mixture of an acrylonitrile-butadiene rubber-modified high-ortho phenolic resin and an acrylic rubber-modified phenolic resin, or (3) a resin mixture of an acrylic rubber-modified phenolic resin and a nitrile rubber-modified phenolic resin, exhibit little change in the vibration damping factor (tan $\delta$) and are effective for preventing squeal during brake operation. Moreover, these friction materials provide all desired performance features including wear resistance, functional stability, moldability, and fade resistance. These asbestos-free friction materials are able to effectively resolve the outstanding problems in the prior art.

Thus, according to a first aspect of the invention, there is provided a non-asbestos friction material made by molding and curing a composition comprising a fibrous base, a binder and a filler, the friction material having a 100 Hz vibration damping factor (tan δ) at 300° C. minus tan δ at 50° C. value of at least −0.030

According to a second aspect of the invention, there is provided a non-asbestos friction material made by molding and curing a composition comprising a fibrous base, a binder and a filler, wherein the binder is a rubber-modified high-ortho phenolic resin.

According to a third aspect of the invention, there is provided a non-asbestos friction material made by molding and curing a composition comprising a fibrous base, a binder and a filler, wherein the binder is a resin mixture of a rubber-modified high-ortho phenolic resin and a rubber-modified phenolic resin.

According to a fourth aspect of the invention, there is provided a non-asbestos friction material made by molding and curing a composition comprising a fibrous base, a binder and a filler, wherein the binder is a resin mixture of an acrylic rubber-modified phenolic resin and a nitrile rubber-modified phenolic resin.

DETAILED DESCRIPTION OF THE INVENTION

Figure 1:
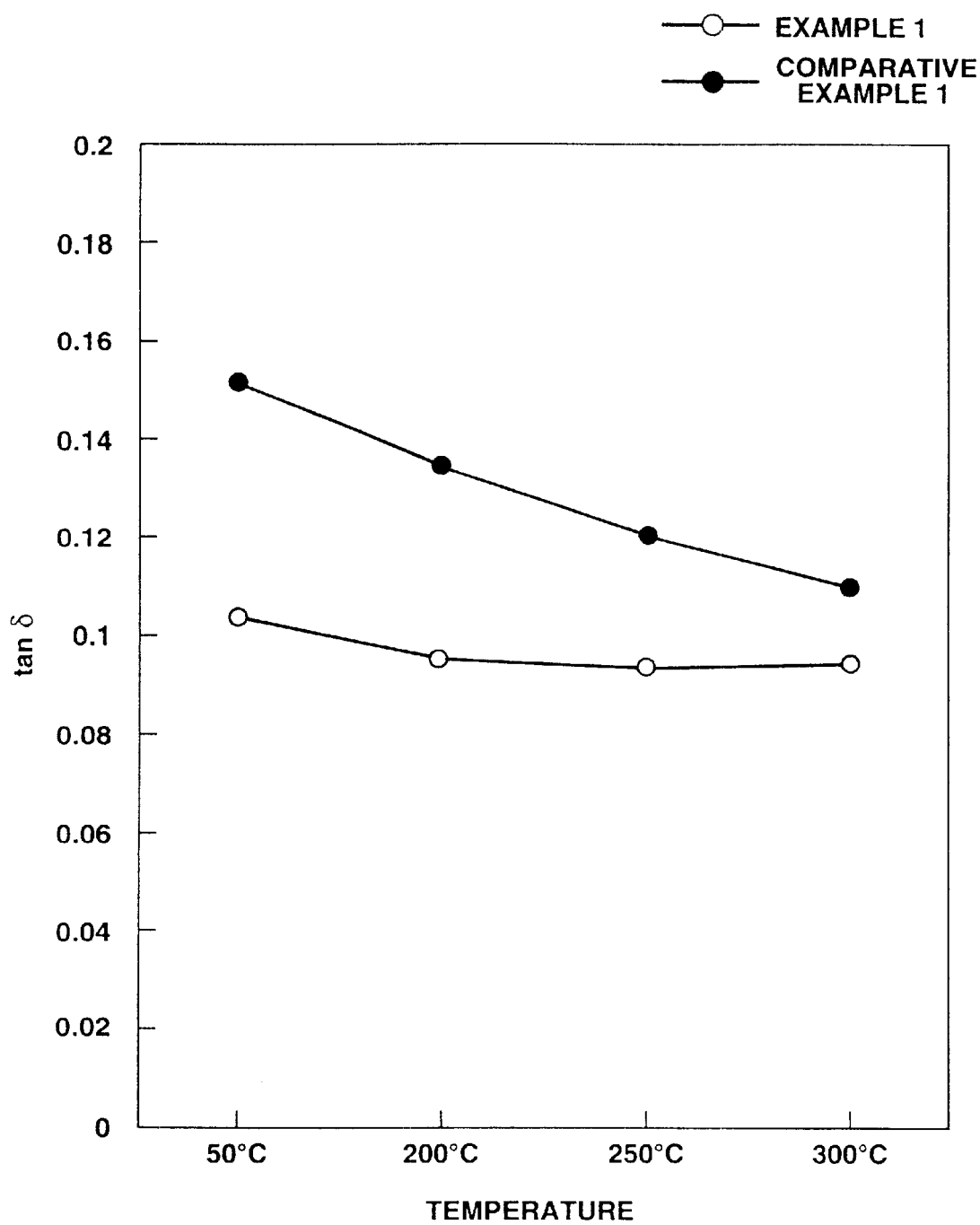
FIG. 1 is a graph of the measurement temperature versus tan δ in Example 1 and Comparative Example 1.

The non-asbestos friction material according to the first aspect of this invention is characterized by having a value for the 100 Hz vibration damping factor (tan δ) at 300° C. minus tan δ at 50° C. of at least −0.030 (meaning that $v_{300}-V_{50} \geq -0.030$). By reducing the decrease in the vibration damping factor or actually increasing the vibration damping factor in this way, the inventive material markedly improves noise suppressing effects.

The above change in the vibration damping factor ($V_{300}-V_{50}$), when lower than −0.030, is disadvantageous for noise suppression. This change in the vibration damping factor is preferably within a range of from −0.025 to 0.030, more preferably from −0.020 to 0.025, even more preferably from −0.015 to 0.021, and most preferably from −0.010 to 0.010. That is, a smaller change in the vibration damping factor is preferred.

Moreover, the friction material of the invention preferably has a vibration damping factor at 50° C. (tan δ) of not more than 0.13, more preferably from 0.1 to 0.13, and most preferably from 0.1 to 0.126. A vibration damping factor (tan δ) at 50° C. outside of the above range may be disadvantageous for noise suppression.

The vibration damping factor is a value measured in accordance with JIS K 7198 ("Method for testing temperature dependence of dynamic viscoelastic properties of plastics by non-resonant, forced, fixed-frequency oscillation").

Such non-asbestos friction materials can be made by molding and curing a composition comprised of (A) a fibrous base, (B) a binder, and (C) a filler. No particular limits are imposed on the types and amounts of components (A) to (C) in the composition, provided they are selected such as to achieve the above-described change in the vibration damping factor. Of these components, selection of the binder is especially important. A change in the vibration damping factor within the desired range can be more effectively achieved by using as the binder (1) a rubber-modified high-ortho phenolic resin, (2) a resin mixture of a rubber-modified high-ortho phenolic resin and a rubber-modified phenolic resin, or (3) a resin mixture of at least two rubber-modified phenolic resins, especially an acrylic rubber-modified phenolic resin and a nitrile rubber-modified phenolic resin.

This can be explained as follows. A high vibration damping factor in a friction material is generally regarded as advantageous for noise performance. Friction materials containing a rubber-modified high-ortho phenolic resin as the binder lower the damping ratio even further than prior-art binders associated with poor noise characteristics, and would thus be expected to have a poor noise performance. Contrary to expectations, however, the noise performance is better than in prior-art friction materials, with squeal being effectively suppressed. Upon investigation, it turns out that using as the binder (1) a rubber-modified high-ortho phenolic resin, (2) a resin mixture of a rubber-modified high-ortho phenolic resin and a rubber-modified phenolic resin, or (3) a resin mixture of two or more rubber-modified phenolic resins, especially a resin mixture of an acrylic rubber-modified phenolic resin and a nitrile rubber-modified phenolic resin, reduces the change in the vibration damping factor. Hence, as noted above, although the reason is not entirely clear, a noise suppressing effect is achieved.

Accordingly, the non-asbestos friction materials of the second to fourth aspects of the invention are characterized by using as the binder (1) a rubber-modified high-ortho phenolic resin, (2) a resin mixture of a rubber-modified high-ortho phenolic resin and a rubber-modified phenolic resin, or (3) a resin mixture of two or more rubber-modified phenolic resins.

The rubber-modified high-ortho phenolic resin (1) mentioned above is a high-ortho type novolac phenolic resin that has been modified by the addition of a rubber constituent.

Advantageously, the high-ortho phenolic resin used herein is prepared in such a way that the ortho bond to para bond ratio (O/P) at methylene linkages within the resin is at least 1.0, preferably from 1.0 to 4.5, more preferably from 1.0 to 3.0, and most preferably from 1.0 to 1.5. Too low a ratio may result in longer molding and curing times. On the other hand, a ratio higher than the above range does improve the rapid curability, but it makes the molded article too hard. Hence, the objects of the present invention may not be attainable if the O/P ratio is too low or too high.

The O/P ratio can be determined by infrared absorption spectroscopy, from the ratio between the ortho bond absorbance that appears at 730 to 770 $cm^{-1}$ and the para bond absorbance that appears at 800 to 840 $cm^{-1}$.

Subsequent to the preparation of the high-ortho phenolic resin, the rubber constituent is added thereto in a molten state to produce a rubber-modified high-ortho phenolic resin.

The rubber constituent is preferably liquid, for uniform mixability and reactivity with the resin. Suitable examples include liquid acrylonitrile-butadiene rubber (NBR), liquid acrylic rubber, liquid styrene-butadiene rubber (SBR), liquid butadiene rubber (BR), liquid chloroprene rubber (CR), liquid silicone rubber, and liquid acrylate-containing elastomers. A liquid NBR and liquid acrylic rubber both having a molecular weight of 1,000 to 30,000 are especially preferred. The liquid rubber constituent may be either a solvent-free liquid rubber or a solution of the rubber constituent in a solvent.

In the case of liquid NBR, this rubber constituent is added in an amount (also referred to hereinafter as the "rubber content"), based on the rubber-modified high-ortho phenolic resin as a whole, of preferably at least 10% by weight, and more preferably 10 to 15% by weight. Less than 10% by weight of the rubber constituent would fail to impart elasticity to the friction material, which is disadvantageous for noise suppression. On the other hand, more than 15% by weight of the rubber constituent would result in inferior functional stability and fade resistance by the friction material.

The resulting rubber-modified high-ortho phenolic resin is molded after hexamethylenetetramine (hexamine) is added thereto as a curing agent, typically in an amount of 5 to 15% by weight.

Suitable use may be made of any of methods (1) to (5) below to prepare the rubber-modified high-ortho phenolic resin of the present invention.
(1) Dissolve the rubber constituent in a phenol that has been warmed and melted, then add a catalyst and an aldehyde, and carry out the reaction to give the resin.
(2) Add together a phenol, an aldehyde and a catalyst, and carry out a reflux reaction. Then add the rubber constituent and carry out a dehydration reaction to give the resin.
(3) Add together a phenol, an aldehyde and a catalyst, and carry out a reflux reaction and a dehydration reaction. Then add the rubber constituent and mix at a high temperature.
(4) Mix a solid phenolic resin together with the rubber constituent in a kneading apparatus such as a pressure kneader.
(5) Mill and mix together a solid phenolic resin and hexamethylenetetramine while at the same time adding and blending therein the rubber constituent.

When a resin mixture of a rubber-modified high-ortho phenolic resin and a rubber-modified phenolic resin (2) is used as the binder, this may include the same rubber-modified high-ortho phenolic resin as the resin (1) described above.

With respect to the rubber-modified phenolic resin serving as the other resin in resin mixture (2), its rubber constituent is preferably selected from among acrylic rubber, nitrile rubber, chloroprene rubber, butadiene rubber, styrene-butadiene rubber, silicone rubber, and mixtures thereof. Of these, a phenolic resin modified with acrylic rubber as the rubber constituent, that is, an acrylic rubber-modified phenolic resin is preferred.

Advantageously, the rubber content in the rubber-modified phenolic resin is at least 10% by weight, preferably 10 to 40% by weight, more preferably 15 to 35% by weight, and most preferably 15 to 30% by weight.

It is acceptable for the phenolic resin in the rubber-modified phenolic resin to have an O/P ratio below 1.0, preferably 0.5 to 0.9, and more preferably 0.7 to 0.9.

When this resin mixture (2) is a mixture of an acrylic rubber-modified phenolic resin and an acrylonitrile-butadiene rubber-modified high-ortho phenolic resin, it is preferable for the sake of noise suppression and other considerations to set the mixing ratio of these two resins (i.e., the weight ratio of the acrylic rubber-modified phenolic resin to the acrylonitrile-butadiene rubber-modified high-ortho phenolic resin) within a range of 1/10 to 3/2, and especially 1/4 to 1/1.

In cases where the above-mentioned resin mixture (3) of two or more rubber-modified phenolic resins is used as the binder, the rubber-modified phenolic resins therein may be selected from among the same ones that may be used as the rubber-modified phenolic resin in above resin mixture (2), and may indeed consist of a combination of two or more of these. A resin mixture of an acrylic rubber-modified phenolic resin and a nitrile rubber-modified phenolic resin is preferred. These phenolic resins are ones having an O/P ratio of preferably less than 1.0, more preferably 0.5 to 0.9, and most preferably 0.7 to 0.9.

If the above-described resin mixture (3) is a mixture of an acrylic rubber-modified phenolic resin and a nitrile rubber-modified phenolic resin, it is preferable for the sake of noise suppression and other considerations to set the mixing ratio (weight ratio of acrylic rubber-modified phenolic resin to nitrile rubber-modified phenolic resin) within a range of 1/10 to 3/2, and especially 1/4 to 1/1.

Any of above binders (1) to (3) is preferably added in an amount of 3 to 30% by weight, more preferably 8 to 25% by weight, and most preferably 10 to 20% by weight, based on the overall friction material composition. When an acrylic rubber-modified phenolic resin is used in particular, the decline in heat resistance is modest even with a high rubber content. In this case, the addition of 20 to 35% by weight of acrylic rubber is advantageous. On the other hand, when a nitrile rubber-modified phenolic resin is used, too high a rubber content results in a decline in the heat resistance, and so the addition of 10 to 20% by weight of nitrile rubber is preferred. If the amount of the binder added is too small (i.e., less than 3% of the composition), there is a possibility that good molded articles cannot be obtained due to the lack of binding. On the other hand, the addition of too much binder would compromise the functional stability and fade resistance of the friction material.

As described above, the non-asbestos friction material of this invention is made by molding and curing a composition comprised of (A) a fibrous base, (B) a binder, and (C) a filler. The fibrous base serving as component (A) may be any inorganic fiber or organic fiber commonly used in friction materials, other than asbestos. Suitable examples of this fibrous base include inorganic fibers such as metal fibers (e.g., iron, copper, brass, bronze, and aluminum), ceramic fibers, potassium titanate fibers, glass fibers, carbon fibers, rock wool, wollastonite, sepiolite, attapulgite, and artificial mineral fibers; and organic fibers such as aramid fibers, polyimide fibers, polyamide fibers, phenolic fibers, cellulose, and acrylic fibers. These may be used alone, or as combinations of two or more thereof. Of the above, aramid fibers and glass fibers are preferred.

The fibrous base (A) may be used in the form of short fibers or a powder. The fibrous base is added in an amount of 1 to 50% by weight, and preferably 5 to 40% by weight, based on the overall friction material composition.

Component (C) is a filler which may be any of well-known organic and inorganic fillers commonly used in friction materials. Suitable examples of inorganic fillers include molybdenum disulfide, antimony trisulfide, calcium carbonate, barium sulfate, magnesium oxide, graphite, calcium hydroxide, calcium fluoride, talc, iron oxide, mica, iron sulfide, metal powders (e.g., aluminum powder, copper powder, and brass powder), and vermiculite. These may be used alone or as combinations of two or more thereof. Suitable examples of organic fillers include cashew dust, tire tread powder, rubber dust, nitrile rubber dust (vulcanized product), and acrylic rubber dust (vulcanized product). These may be used alone or as combinations of two or more thereof. The filler (C) is preferably added in an amount of 20 to 96% by weight, and especially 40 to 85% by weight, based on the overall friction material composition.

The method of making the friction material of the invention involves first uniformly mixing components (A) to (C) in a suitable mixer such as a Henschel mixer, Lödige mixer, or Eirich mixer so as to give a molding powder, and preforming this powder in a mold. The preform is then molded at a temperature of 130 to 200° C. and a pressure of 100 to 1,000 kg/cm² for a period of 2 to 10 minutes. The use of a rapid-curing binder such as a rubber-modified high-ortho phenolic resin enables the molding time to be considerably shortened from the 4 to 20 minutes required in the prior art, thus enhancing productivity.

The thus molded article is heat treated or postcured at 140 to 250° C. for 2 to 48 hours, followed by spray painting, firing, and polishing as needed. This gives a finished article.

In the case of automotive disk pads, for example, production may be carried out by placing the preform on an iron or aluminum plate that has been pre-washed, surface treated, and coated with an adhesive, then shaping and heat treating the preform in this state within a mold.

The non-asbestos friction materials of the invention are highly suitable for a variety of uses, including brake linings, clutch facings, disk pads, paper clutch facings, and brake shoes in automobiles, heavy duty trucks, railroad cars, and various types of industrial equipment.

EXAMPLE

Examples and comparative examples are given below by way of illustration, and are not intended to limit the invention.

Examples 1–7 and Comparative Examples 1–2

A novolac phenolic resin having the O/P ratio shown in Table 1 was synthesized in each example. The resins were then modified with NBR, giving NBR-modified phenolic resins A to G. Phenolic resin H is an unmodified one.

Using a Lödige mixer, each of the phenolic resins was uniformly mixed with the compounding ingredients shown in Table 2. The compositions were preformed in a pressure mold under a pressure of 100 kg/cm² for 1 minute. Each preform was molded for the desired length of time at a temperature of 145° C. and a pressure of 180 kg/cm², then heat-treated or postcured at 180° C. for 5 hours, yielding friction materials for the respective examples.

The resulting friction materials were evaluated for short-time moldability, noise performance, functional stability, and fade resistance according to the procedures described below. The results are shown in Tables 2 and 3.

The short-time moldability, noise performance, functional stability, and fade resistance were each rated in Tables 2 and 3 as excellent (Exc), good (Good), somewhat poor (Poor), or very poor (VP). The fade resistance indicates the change in the coefficient of friction ($\mu$) with respect to temperature change.

Figure 2:
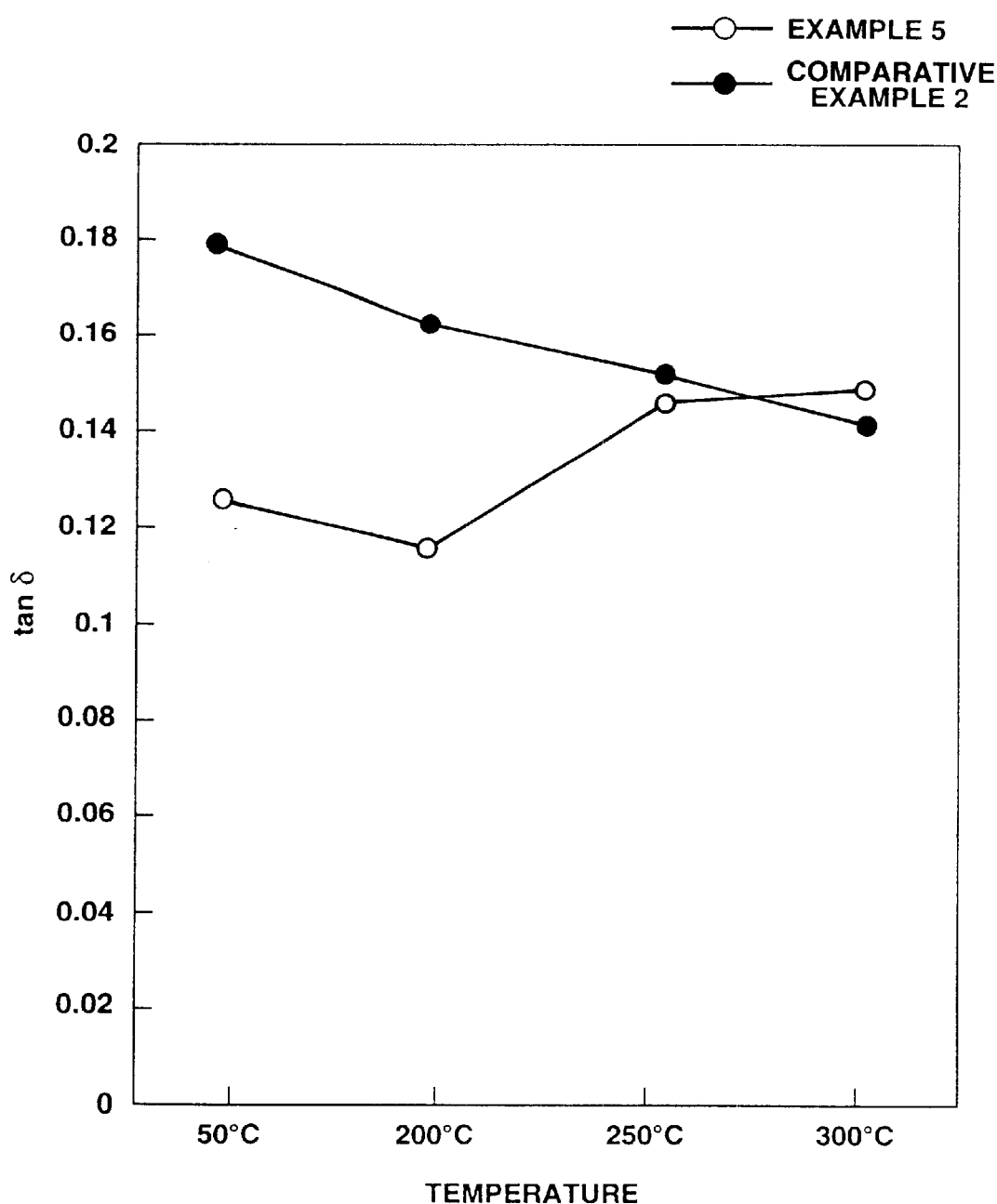
FIG. 2 is a graph of the measurement temperature versus tan δ in Example 5 and Comparative Example 2.

Test pieces measuring 55(L)×10(W)×3 mm(T) were fabricated from the compositions prepared in Examples 1, 2, and 5–7, and Comparative Examples 1 and 2. These test pieces were used to measure the vibration damping factor (tan δ) by the method described subsequently. The results are shown in Table 4. In addition, FIG. 1 plots the results from Example 1 and Comparative Example 1, and FIG. 2 plots the results from Example 5 and Comparative Example 2.

Vibration Damping Factor (tan δ)

The vibration damping factor (tan δ) was determined in accordance with JIS K 7198 using a viscoelasticity measurement apparatus (DMS-6100, manufactured by Seiko Denshi Kogyo K.K.) by means of a non-resonant, forced vibration method in the bending mode. In the test, which was conducted within a temperature range of 50 to 300° C. and at a temperature rise rate of 4° C./min, the test piece was clamped firmly at both ends and the center was vibrated at 100 Hz. Three test pieces were fabricated from the same sample, and the tan δ value for that friction material was obtained by taking the average of the measured results for the three pieces.

TABLE 1

| | Phenolic resin (parts by weight) | | | | | | | |
|---|---|---|---|---|---|---|---|---|
| | A | B | C | D | E | F | G | H |
| O/P ratio | 1.3 | 1.0 | 1.5 | 0.8 | 1.5 | 2.5 | 4.0 | 1.5 |
| NBR | 14 | 10 | 15 | 14 | 8 | 15 | 15 | 0 |
| Hexamine | 9 | 9 | 9 | 9 | 9 | 9 | 9 | 9 |

Note:
The O/P ratio is determined by infrared absorption spectroscopy from the ratio of the ortho bond absorbance appearing at 730 to 770 cm⁻¹ to the para bond absorbance appearing at 800 to 840 cm⁻¹.
NBR is an acrylonitrile-butadiene rubber having a molecular weight about 5,000.

TABLE 2

| | | Ex 1 | Ex 2 | Ex 3 | Ex 4 | Ex 5 | Ex 6 | Ex 7 |
|---|---|---|---|---|---|---|---|---|
| Formu- | Aramid fibers | 10 | 10 | 10 | 10 | 6 | 10 | 10 |
| lation | Glass fibers | 10 | 10 | 10 | 10 | 15 | 10 | 10 |
| (pbw) | Calcium carbonate | 20 | 20 | 20 | 20 | 25 | 20 | 20 |
| | Barium sulfate | 19 | 19 | 19 | 19 | 7 | 19 | 19 |
| | Cashew dust | 15 | 15 | 15 | 15 | 5 | 15 | 15 |
| | Graphite | 3 | 3 | 3 | 3 | 10 | 3 | 3 |
| | Rubber dust | 8 | 8 | 8 | 8 | 15 | 8 | 8 |
| | Phenolic resin | A | B | C | E | A | F | G |
| | | 15 | 15 | 15 | 15 | 17 | 15 | 15 |
| Per- | Short-time moldability | Exc | Good | Exc | Exc | Exc | Exc | Exc |
| form- | Noise performance | Exc | Good | Exc | Poor | Good | Exc | Exc |
| ance | Functional stability | Good | Exc | Good | Exc | Good | Good | Good |
| | Fade resistance | Good | Exc | Good | Good | Good | Good | Good |

TABLE 3

|  | CE 1 | CE 2 |
|---|---|---|
| Formulation (pbw) |  |  |
| Aramid fibers | 10 | 6 |
| Glass fibers | 10 | 15 |
| Calcium carbonate | 20 | 25 |
| Barium sulfate | 19 | 7 |
| Cashew dust | 15 | 5 |
| Graphite | 3 | 10 |
| Rubber dust | 8 | 15 |
| Phenolic resin | D | H |
|  | 15 | 17 |
| Performance |  |  |
| Short-time moldability | VP | Exc |
| Noise performance | Poor | VP |
| Functional stability | Good | Good |
| Fade resistance | Good | Good |

From the results in Tables 2 and 3, it is apparent that the non-asbestos friction materials within the scope of the invention can be molded in a short period of time, in addition to which they have excellent noise performance and functional stability, as well as good fade resistance.

TABLE 4

|  |  | Measurement temperature | | | |
|---|---|---|---|---|---|
|  |  | 50° C. | 200° C. | 250° C. | 300° C. |
| Example 1 | tanδ | 0.103 | 0.095 | 0.092 | 0.094 |
|  | Change | — | −0.008 | −0.011 | −0.009 |
| Example 2 | tanδ | 0.116 | 0.106 | 0.109 | 0.104 |
|  | Change | — | −0.010 | −0.007 | −0.012 |
| Example 5 | tanδ | 0.126 | 0.115 | 0.147 | 0.147 |
|  | Change | — | −0.011 | 0.021 | 0.021 |
| Example 6 | tanδ | 0.12 | 0.112 | 0.104 | 0.101 |
|  | Change | — | −0.008 | −0.016 | −0.019 |
| Example 7 | tanδ | 0.116 | 0.109 | 0.099 | 0.096 |
|  | Change | — | −0.007 | −0.017 | −0.020 |
| Comp. Ex. 1 | tanδ | 0.152 | 0.134 | 0.120 | 0.110 |
|  | Change | — | −0.018 | −0.032 | −0.042 |
| Comp. Ex. 2 | tanδ | 0.180 | 0.163 | 0.154 | 0.143 |
|  | Change | — | −0.017 | −0.026 | −0.037 |

Note:
"Change" refers here to the tan δ value at 50° C. subtracted from the tan δ values at the various other measurement temperatures.

The results shown in Table 4 and FIGS. 1 and 2 confirm that the friction materials within the scope of the invention experience a smaller change in vibration damping factor, and are thus more stable, than the friction materials in the comparative examples.

Examples 8 and 9

The friction material compositions shown in Table 5 were formulated in the proportions indicated, and uniformly mixed using a Lödige mixer. The compositions were then preformed in a pressure mold under a pressure of 100 kg/cm² for a period of 1 minute. The preforms were molded for the desired length of time at a temperature of 145° C. and a pressure of 180 kg/cm², then heat treated or postcured at 180° C. for 5 hours. This procedure yielded friction materials in the respective examples.

TABLE 5

|  | Ex 8 | Ex 9 |
|---|---|---|
| Formulation |  |  |
| Aramid fibers | 7 | 7 |
| Glass fibers | 7 | 7 |
| Cashew dust | 17 | 17 |
| Calcium carbonate | 13 | 13 |
| Barium sulfate | 21 | 21 |
| Graphite | 7 | 7 |
| Copper powder | 17 | 17 |
| NBR-modified high-ortho phenolic resin[1] | 5.5 | 8.5 |
| Acrylic rubber-modified phenolic novolac resin[2] | 5.5 | 2.5 |
| Total (% by weight) | 100 | 100 |
| Performance |  |  |
| Short-time moldability | Good | Exc |
| Noise performance | Good | Exc |
| Functional stability | Exc | Good |
| Fade resistance | Exc | Good |

[1]NBR-modified high-ortho phenolic resin with O/P ratio of 1.3 and NBR content of 14% by weight. NBR's molecular weight about 5,000
[2]Acrylic rubber-modified phenolic novolac resin with O/P ratio of 0.7 and acrylic rubber content of 30% by weight. Acrylic rubber's molecular weight about 7,000

Test pieces measuring 55(L)×10(W)×3 mm(T) were fabricated from the compositions prepared in Examples 8 and 9. These test pieces were used to measure the vibration damping factor (tan δ) in the same manner as described above. The results are shown in Table 6. In addition, FIG. 3 plots the results from Examples 8 and 9.

TABLE 6

|  | Measurement temperature | | | | Difference |
|---|---|---|---|---|---|
|  | 50° C. | 100° C. | 200° C. | 300° C. | (300° C. − 50° C.) |
| Example 8 | 0.116 | 0.096 | 0.093 | 0.105 | −0.011 |
| Example 9 | 0.116 | 0.099 | 0.101 | 0.104 | −0.012 |

Figure 3:
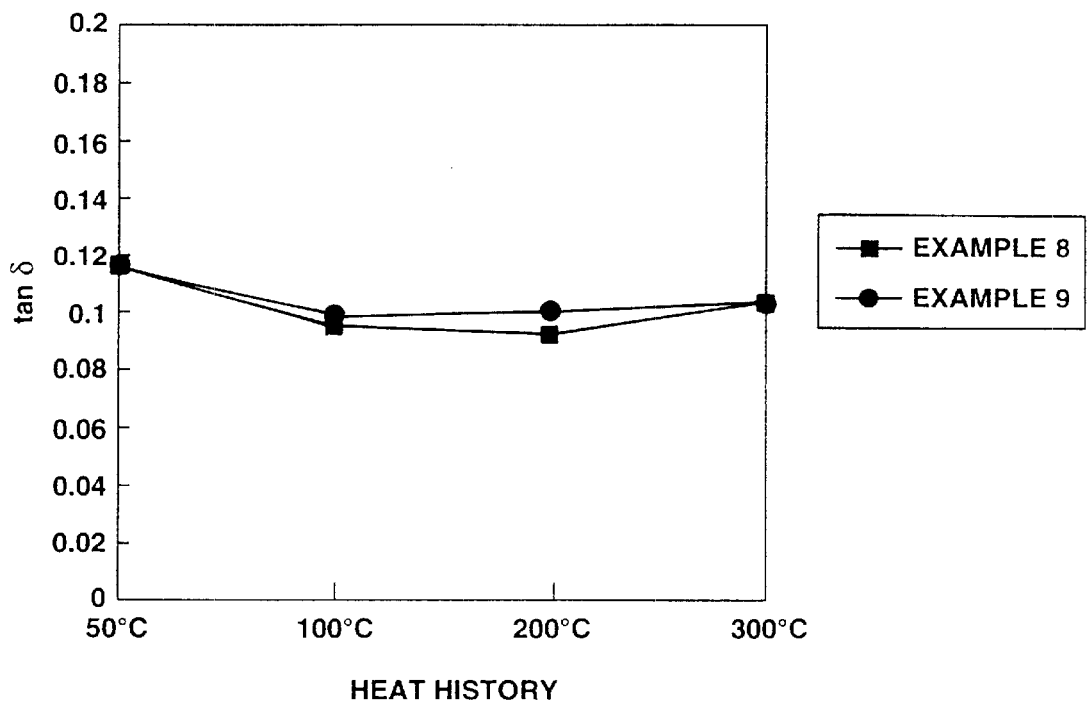
FIG. 3 is a graph of the measurement temperature (heat history) versus tan δ in Examples 8 and 9.

As is apparent from the results shown in Tables 5 and 6, and in FIG. 3, the non-asbestos friction materials within the scope of the invention can be molded in a short time, in addition to which they have excellent noise performance and functional stability, and good fade resistance. Moreover, these friction materials according to the invention were confirmed from the above results to undergo a smaller change in the vibration damping factor, and thus to be more stable, than the friction materials in the comparative examples.

Examples 10–11 and Comparative Examples 3–4

The friction material compositions shown in Table 7 were formulated in the proportions indicated, and uniformly mixed using a Lödige mixer. The compositions were then preformed in a pressure mold under a pressure of 100 kg/cm² applied for a period of 1 minute. The preforms were molded for the desired length of time at a temperature of 145° C. and a pressure of 180 kg/cm², then heat treated or postcured at 180° C. for 5 hours. This procedure yielded heavy duty truck brake linings in the respective examples and comparative examples.

TABLE 7

|  | Ex 10 | Ex 11 | CE 3 | CE 4 |
|---|---|---|---|---|
| Aramid fibers | 7 | 7 | 7 | 7 |
| Glass fibers | 7 | 7 | 7 | 7 |
| Cashew dust | 17 | 17 | 17 | 17 |
| Calcium carbonate | 13 | 13 | 13 | 13 |
| Barium sulfate | 21 | 21 | 21 | 21 |
| Graphite | 7 | 7 | 7 | 7 |
| Copper powder | 17 | 17 | 17 | 17 |
| Acrylic rubber-modified phenolic novolac resin[3] | 5.5 | 2.5 | 11 | — |
| Nitrile rubber-modified phenolic novolac resin[4] | 5.5 | 8.5 | — | 11 |
| Total (% by weight) | 100 | 100 | 100 | 100 |

[3]Acrylic rubber-modified phenolic novolac resin with O/P ratio of 0.7 and acrylic rubber content of 30% by weight. Acrylic rubber's molecular weight about 7,000
[4]Nitrile rubber-modified phenolic novolac resin with O/P ratio of 0.7 and nitrile rubber content of 14% by weight. NBR's molecular weight about 5,000

Figure 4:
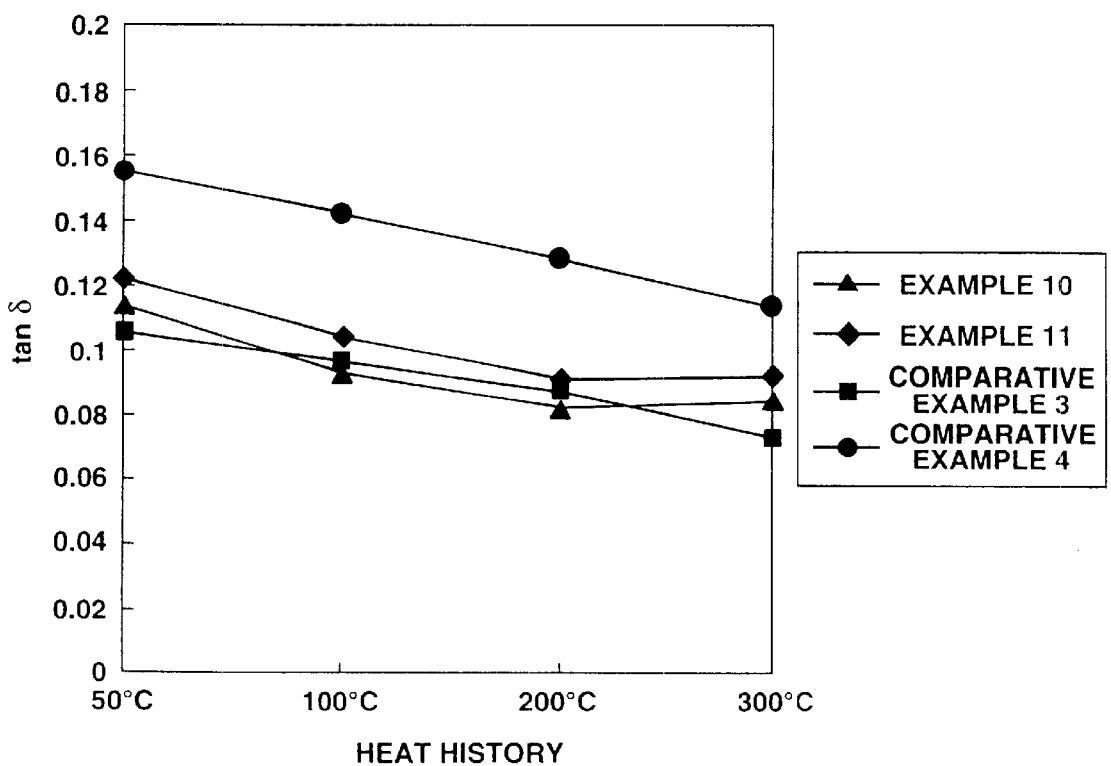
FIG. 4 is a graph of the measurement temperature (heat history) versus tan δ in Examples 10 and 11, and in Comparative Examples 3 and 4.

Test pieces measuring 55(L)×10(W)×3 mm(T) were fabricated from the compositions prepared in Examples 10 and 11, and Comparative Examples 3 and 4. These test pieces were used to measure the vibration damping factor (tan δ) by the same method as described above. The results are shown in Table 8. In addition, FIG. 4 plots the results from Examples 10 and 11, and Comparative Examples 3 and 4.

TABLE 8

|  | Measurement temperature | | | | Difference |
|---|---|---|---|---|---|
|  | 50° C. | 100° C. | 200° C. | 300° C. | (300° C. − 50° C.) |
| Example 10 | 0.112 | 0.092 | 0.081 | 0.084 | −0.028 |
| Example 11 | 0.121 | 0.103 | 0.090 | 0.091 | −0.030 |
| Comp. Ex. 3 | 0.104 | 0.095 | 0.086 | 0.072 | −0.032 |
| Comp. Ex. 4 | 0.155 | 0.142 | 0.128 | 0.113 | −0.042 |

As is apparent from the results shown in Table 8, unlike the comparative examples, Examples 10 and 11 have a tan δ difference (i.e., the tan δ value at 300° C. minus the tan δ value at 50° C.) of −0.030 or higher, which indicates excellent noise performance.

The truck brake linings obtained in Examples 10 and 11 and Comparative Examples 3 and 4 were then subjected to (1) a road vehicle JASO C404-87 performance test for heavy duty trucks with a constant load (gross vehicle weight, 20 metric tons), and (2) a moldability evaluation, each conducted as described below. The results are presented in Table 9.

(1) Road Vehicle JASO C404-87 Performance Test for Heavy Duty Trucks (GVW=20 t)

The truck brake linings fabricated in Working Examples 10 and 11 and Comparative Examples 3 and 4 were mounted on heavy duty trucks and subjected to the road vehicle JASO C404-87 performance test for heavy duty trucks with a constant load (GVW, 20 metric tons), in which the first-half (total of about 1,800 braking cycles for breaking in and for performance, routine braking operation, and noise tests), second-half (total of about 600 braking cycles for effectiveness, routine braking operation, and noise tests), and overall noise generation ratios were measured.

(2) Moldability

The moldability was rated in Table 9 as excellent (Exc), good (Good), somewhat poor (Poor), or very poor (VP).

TABLE 9

|  | Example 10 | Example 11 | Comp. Ex. 3 | Comp. Ex. 4 |
|---|---|---|---|---|
| First-half noise generation ratio (%) | 1.5 | 1.3 | 6.5 | 1.1 |
| Second-half noise generation ratio (%) | 1.7 | 1.8 | 7.5 | 24.7 |
| Overall noise generation ratio (%) | 1.6 | 1.6 | 7.0 | 12.9 |
| Moldability | Good | Exc | VP | Exc |

From the results in Table 9, the brake lining of Comparative Example 3, in which acrylic rubber-modified phenolic resin was used as the sole binder, had a high noise generation ratio throughout, from the first half to the second half of the test. In addition, the moldability was poor.

The brake lining of Comparative Example 4, which was obtained using a nitrile rubber-modified phenolic resin as the sole binder, had a much higher noise generation ratio in the second half than in the first half of the test, indicating a poor noise performance stability.

By contrast, each of the linings obtained in Examples 10 and 11 had a good moldability. Moreover, the noise generation ratio remained low throughout the first and second halves, resulting in little deterioration over time in the good noise performance.

There have been described non-asbestos friction materials that have excellent noise suppressing effects and essentially do not squeal during brake operation. Moreover, in addition to the above outstanding noise performance, non-asbestos friction materials in which the binder is a rubber-modified high-ortho phenolic resin, a resin mixture of a rubber-modified high-ortho phenolic resin and a rubber-modified phenolic resin, or a resin mixture of two or more rubber-modified phenolic resins, also fully satisfy the other properties required of friction materials, including wear resistance, functional stability, and fade resistance. In addition, because the compositions used to make the friction materials of the invention have excellent rapid curability, they can be molded in a short period of time. This combination of features, along with the low deterioration over time in the excellent noise performance, make for a high-quality product.

Japanese Patent Application Nos. 10-239692 and 10-248660 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A non-asbestos friction material made by providing a binder which is a rubber-modified high-ortho phenolic resin having an ortho bond to para bond ratio at methylene linkages therein of at least 1.0 and subsequently molding and curing a composition comprising a fibrous base, said binder, and a filler, wherein the amount of the fibrous base is 1 to 50% by weight, the amount of the binder is 3 to 30% by weight, and the amount of the filler is 20–96% by weight, based on the overall weight of the friction material.

2. The non-asbestos friction material of claim 1, wherein the rubber constituent in said rubber-modified high-ortho phenolic resin is acrylonitrile-butadiene rubber.

3. The non-asbestos friction material of claim 1, wherein the rubber content in the rubber-modified phenolic resin is from 10 to 40% by weight.

4. The non-asbestos friction material of claim 1, wherein said rubber-modified high-ortho phenolic resin is the product of a process selected from processes (a) through (e):
  (a) warming and melting a phenol, dissolving a rubber constituent in the melted phenol, adding an aldehyde and a catalyst to the solution, and reacting the resulting mixture to produce the rubber-modified high-ortho phenolic resin;
  (b) adding together a phenol, an aldehyde, and a catalyst, and carrying out a reflux reaction, then adding a rubber constituent to the reaction mixture and carrying out a dehydration reaction to produce the rubber-modified high-ortho phenolic resin;
  (c) adding together a phenol, an aldehyde, and a catalyst, and carrying out a reflux reaction and a dehydration reaction, then adding a rubber constituent to the reaction mixture and mixing the components at high temperature to produce the rubber-modified high-ortho phenolic resin;
  (d) mixing a rubber constituent with a solid phenolic resin constituent in a kneading apparatus to produce the rubber-modified high-ortho phenolic resin; and
  (e) milling, mixing, and blending together a solid phenolic resin, a rubber constituent, and hexamethylenetetramine to produce the rubber-modified high-ortho phenolic resin.

5. The non-asbestos friction material of claim 1, wherein the fibrous base is an organic fiber selected from the group consisting of aramid fibers, polyimide fibers, polyamide fibers, phenolic fibers, cellulose fibers, and acrylic fibers.

6. A non-asbestos friction material as in claim 1, wherein the binder is a rubber-modified high-ortho phenolic resin having an ortho bond to para bond ratio at methylene linkages therein of at least 1.0, the rubber constituent in said rubber-modified high-ortho phenolic resin is acrylonitrile-butadiene rubber, and said rubber-modified high-ortho phenolic resin has an acrylonitrile-butadiene rubber content of at least 10% by weight.

7. A non-asbestos friction material made by providing a binder which is a resin mixture of a rubber-modified high-ortho phenolic resin having an ortho bond to para bond ratio at methylene linkages therein of a least 1.0 and a rubber-modified phenolic resin having an ortho bond to para bond ratio at methylene linkages therein of less than 1.0 and subsequently molding and curing a composition comprising a fibrous base, said binder, and a filler, wherein the amount of the fibrous base is 1 to 50% by weight, the amount of the binder is 3 to 30% by weight, and the amount of the filler is 20–96% by weight, based on the overall weight of the friction material.

8. The non-asbestos friction material of claim 7, wherein the rubber component in said rubber-modified high-ortho phenolic resin is acrylonitrile-butadiene rubber.

9. The non-asbestos friction material of claim 7, wherein the rubber constituent in said rubber-modified phenolic resin is at least one selected from the group consisting of acrylic rubber, nitrile rubber, chloroprene rubber, butadiene rubber, styrene-butadiene rubber and silicone rubber.

10. The non-asbestos friction material of claim 9, wherein said rubber-modified phenolic resin has a rubber content of at least 10% by weight.

11. The non-asbestos friction material of claim 7, wherein said resin mixture is a mixture of an acrylic rubber-modified phenolic resin and an acrylonitrile-butadiene rubber-modified high-ortho phenolic resin in a weight ratio of from 1/10 to 3/2.

12. A non-asbestos friction material as in claim 7,
  wherein the binder is a resin mixture of a rubber-modified high-ortho phenolic resin and a rubber-modified phenolic resin, said rubber-modified high-ortho phenolic resin having an ortho bond to para bond ratio at methylene linkages therein of at least 1.0 and said rubber-modified phenolic resin having an ortho bond to para bond ratio at methylene linkages therein of less than 1.0,
  wherein the rubber constituent in said rubber-modified high-ortho phenolic resin is acrylonitrile-butadiene rubber and said rubber-modified high-ortho phenolic resin has an acrylonitrile-butadiene rubber content of at least 10% by weight,
  wherein the rubber constituent in said rubber-modified phenolic resin is at least one member selected from the group consisting of acrylic rubber, nitrile rubber, chloroprene rubber, butadiene rubber, styrene-butadiene rubber, and silicone rubber, and
  wherein said resin mixture is a mixture of an acrylic rubber-modified phenolic resin and an acrylonitrile-butadiene rubber-modified high-ortho phenolic resin in a weight ratio of from 1:10 to 3:2.

13. The non-asbestos friction material made by providing a binder which is a resin mixture of an acrylic rubber-modified phenolic resin and a nitrile rubber-modified phenolic resin mixed in a weight ratio of from 1:10 to 3:2 and wherein the resin mixture has a rubber content of at least 10% by weight and subsequently molding and curing a composition comprising a fibrous base, said binder, and a filler, wherein the amount of the fibrous base is 1 to 50% by weight, the amount of the binder is 3 to 30% by weight, and the amount of the filler is 20–96% by weight, based on the overall weight of the friction material.

14. A non-asbestos friction material made by providing a binder which is a rubber-modified high-ortho phenolic resin having an ortho bond to para bond ratio at methylene linkages therein of at least 1.0 and subsequently molding and curing a composition comprising a fibrous base, said binder, and a filler, wherein the amount of the fibrous base is 1 to 50% by weight, the amount of the binder is 3 to 30% by weight, and the amount of the filler is 20–96% by weight, based on the overall weight of the friction material, wherein the friction material has a 100 Hz vibration damping factor (tan δ) at 300° C. minus tan δ at 50° C. value of at least −0.030.

15. The non-asbestos friction material of claim 14, wherein the rubber constituent in said rubber-modified high-ortho phenolic resin is acrylonitrile-butadiene rubber.

16. The non-asbestos friction material of claim 15, wherein said rubber-modified high-ortho phenolic resin has an acrylonitrile-butadiene rubber content of at least 10% by weight.

17. The non-asbestos friction material of claim 14, wherein said binder is composed of at least two rubber-modified high-ortho phenolic resins.

18. The non-asbestos friction material of claim 17, wherein said binder is a resin mixture of a rubber-modified high-ortho phenolic resin and a rubber-modified phenolic resin.

19. The non-asbestos friction material of claim 18, wherein said rubber-modified high-ortho phenolic resin has an ortho bond to para bond ratio at methylene linkages therein of at least 1.0, and said rubber-modified phenolic resin has an ortho bond to para bond ratio at methylene linkages therein of less than 1.0.

20. The non-asbestos friction material of claim 19, wherein the rubber constituent in said rubber-modified high-ortho phenolic resin is acrylonitrile-butadiene rubber.

21. The non-asbestos friction material of claim 20, wherein said rubber-modified high-ortho phenolic resin has an acrylonitrile-butadiene rubber content of at least 10% by weight.

22. The non-asbestos friction material of claim 21, wherein the rubber constituent in said rubber-modified phenolic resin is at least one selected from the group consisting of acrylic rubber, nitrile rubber, chloroprene rubber, butadiene rubber, styrene-butadiene rubber and silicone rubber.

23. The non-asbestos friction material of claim 22, wherein said rubber-modified phenolic resin has a rubber content of at least 10% by weight.

24. The non-asbestos friction material of claim 19, wherein said resin mixture is a mixture of an acrylic rubber-modified phenolic resin and an acrylonitrile-butadiene rubber-modified high-ortho phenolic resin in a weight ratio of from 1/10 to 3/2.

25. The non-asbestos friction material of claim 14, wherein said binder is a mixture of an acrylic rubber-modified phenolic resin and a nitrile rubber-modified phenolic resin in a weight ratio of from 1/10 to 3/2.

26. A non-asbestos friction material as in claim 14, the friction material having a 100 Hz vibration damping factor (tan δ) at 300° C. minus tan δ at 50° C. is at least −0.030, wherein said binder is a rubber-modified high-ortho phenolic resin having an ortho bond to para bond ratio at methylene linkages therein of at least 1.0, the rubber constituent in said rubber-modified high-ortho phenolic resin is acrylonitrile-butadiene rubber, and said rubber-modified high-ortho phenolic resin has an acrylonitrile-butadiene rubber content of at least 10% by weight.

27. A non-asbestos friction material as in claim 14, the friction material having a 100 Hz vibration damping factor (tan δ) at 300° C. minus tan δ at 50° C. is at least −0.030, wherein said binder is a resin mixture of a rubber-modified high-ortho phenolic resin and a rubber-modified phenolic resin, said rubber-modified high-ortho phenolic resin having an ortho bond to para bond ratio at methylene linkages therein of a least 1.0 and said rubber-modified phenolic resin having an ortho bond to para bond ratio at methylene linkages therein of less than 1.0, wherein the rubber constituent in said rubber-modified high-ortho phenolic resin is acrylonitrile-butadiene rubber and said rubber-modified high-ortho phenolic resin has an acrylonitrile-butadiene rubber content of at least 10% by weight, the rubber constituent in said rubber-modified phenolic resin being at least one member selected from the group consisting of acrylic rubber, nitrile rubber, chloroprene rubber, butadiene rubber, styrene-butadiene rubber, and silicone rubber, and wherein said resin mixture is a mixture of an acrylic rubber-modified phenolic resin and an acrylonitrile-butadiene rubber-modified high-ortho phenolic resin in a weight ratio of from 1:10 to 3:2.

28. A non-asbestos friction material as in claim 14, the friction material having a 100 Hz vibration damping factor (tan δ) at 300° C. minus tan δ at 50° C. is at least −0.030, wherein said binder is a mixture of an acrylic rubber-modified phenolic resin and a nitrile rubber modified phenolic resin in a weight ratio of from 1:10 TO 3:2.

\* \* \* \* \*